(12) United States Patent
Okubo

(10) Patent No.: US 7,985,136 B2
(45) Date of Patent: Jul. 26, 2011

(54) IMAGE PRODUCING DEVICE, SPEED EXPRESSING METHOD, AND PROGRAM

(75) Inventor: Takeshi Okubo, Minato-ku (JP)

(73) Assignee: Konomi Digital Entertainment Co., Ltd., Tokyo (JP)

( * ) Notice: Subject to any disclaimer, the term of this patent is extended or adjusted under 35 U.S.C. 154(b) by 1305 days.

(21) Appl. No.: 11/587,499

(22) PCT Filed: Apr. 27, 2005

(86) PCT No.: PCT/JP2005/008020
§ 371 (c)(1),
(2), (4) Date: Oct. 24, 2006

(87) PCT Pub. No.: WO2005/106801
PCT Pub. Date: Nov. 10, 2005

(65) Prior Publication Data
US 2007/0249415 A1    Oct. 25, 2007

(30) Foreign Application Priority Data

Apr. 29, 2004 (JP) .................. 2004-163824

(51) Int. Cl.
A63F 9/24 (2006.01)
A63F 13/00 (2006.01)
G06F 17/00 (2006.01)
G06F 19/00 (2006.01)

(52) U.S. Cl. .......... 463/33; 345/419; 345/475; 345/581; 345/473; 463/6; 463/31; 463/30; 382/264; 382/284; 382/103; 382/261

(58) Field of Classification Search .................. 345/419, 345/581
See application file for complete search history.

(56) References Cited

U.S. PATENT DOCUMENTS

| | | | | |
|---|---|---|---|---|
| 5,986,659 A | * | 11/1999 | Gallery et al. | ................ 345/419 |
| 6,236,402 B1 | * | 5/2001 | Edmark | ........................ 345/419 |
| 6,426,755 B1 | * | 7/2002 | Deering | ........................ 345/581 |

(Continued)

FOREIGN PATENT DOCUMENTS

EP    0989524 A2    3/2000

(Continued)

OTHER PUBLICATIONS

International Search Report PCT/JP2005/008020 dated Jun. 14, 2005, 1 page.

(Continued)

*Primary Examiner* — Paul A. D'Agostino
(74) *Attorney, Agent, or Firm* — Howard & Howard Attorneys PLLC

(57) ABSTRACT

An operation input reception unit (201) receives an operation input for a virtual vehicle. A running condition managing unit (203) manages the running condition of the virtual vehicle based on the received operation input. An image producing unit (204) produces a view field image seen from the viewpoint of the moving object based on stored image information and the managed moving condition. A velocity calculation unit (205) calculates the velocity of the moving object based on the managed moving condition. A deformed image producing unit (206) extracts an image of a rectangular area based on the velocity from the produced view field image and produces a deformed image obtained by deforming the extracted image into a trapezoidal shape. A display control unit (207) synthesizes the produced view field image and the produced deformed image and displays the synthesized image.

4 Claims, 13 Drawing Sheets

U.S. PATENT DOCUMENTS

| | | | |
|---|---|---|---|
| 6,443,842 B1* | 9/2002 | Totsuka | 463/31 |
| 6,925,210 B2* | 8/2005 | Herf | 382/264 |
| 7,167,600 B2* | 1/2007 | Yamamoto | 382/284 |
| 7,193,629 B2* | 3/2007 | Kake et al. | 345/581 |
| 7,702,131 B2* | 4/2010 | Chinen et al. | 382/103 |
| 7,792,383 B2* | 9/2010 | Hatalsky | 382/261 |
| 2001/0008841 A1* | 7/2001 | Komata | 463/6 |
| 2002/0027555 A1* | 3/2002 | Mori | 345/475 |
| 2003/0096647 A1* | 5/2003 | Ouchi | 463/30 |
| 2007/0120858 A1* | 5/2007 | Meinds | 345/473 |

FOREIGN PATENT DOCUMENTS

| | | | |
|---|---|---|---|
| EP | 1391846 A | | 2/2004 |
| EP | 1391847 A | | 2/2004 |
| JP | 06-301794 | | 10/1994 |
| JP | 07-185133 | | 7/1995 |
| JP | 2001-160153 | | 5/2001 |
| JP | 2002-170131 | | 6/2002 |
| JP | 2006092156 A | * | 4/2006 |

OTHER PUBLICATIONS

Supplementary European Search Report EP05736482 dated Mar. 9, 2009, 3 pages.

Yang et al., "Pat-Based Image Metamorphosis Computer Graphics," College of Computer Science & Technology, Shandong University, Jinan 250100, China, Journal of Guizhou University of Technology, vol. 31, No. 4, Aug. 2002, pp. 93-99.

Chinese Office Action CN200580021982.1 dated Dec. 19, 2008, 9 pages.

* cited by examiner

RUNNING CONDITIONS OF RACING CAR OPERATED BY USER

| CURRENT POSITION | RUNNING DIRECTION | ACCELERATOR | BRAKE | SHIFTER | STEERING ANGLE | ... |
|---|---|---|---|---|---|---|
| (x1, y1, z1) | (xa, yb, zc) | 50 | 0 | THIRD | 0 | ... |

FIG. 4A

RUNNING CONDITIONS OF OTHER RACING CARS

| VEHICLE ID | CURRENT POSITION | RUNNING DIRECTION | ACCELERATOR | BRAKE | SHIFTER | STEERING ANGLE | ... |
|---|---|---|---|---|---|---|---|
| 001 | (x2, y2, z2) | (x2, y2, z3) | 50 | 0 | THIRD | +5 | ... |
| 002 | (x3, y3, z3) | (x2, y2, z3) | 100 | 0 | FIFTH | 0 | ... |
| 003 | (x4, y4, z4) | (x2, y2, z3) | 30 | 90 | SECOND | +25 | ... |
| 004 | (x5, y5, z5) | (x2, y2, z3) | 100 | 40 | FOURTH | −10 | ... |

FIG. 4B

IMAGE PRODUCING DEVICE, SPEED EXPRESSING METHOD, AND PROGRAM

TECHNICAL FIELD

The present invention relates to an image producing device, a speed expressing method, and a program suitable for appropriately expressing the speed of a moving object in a virtual space.

BACKGROUND ART

Conventionally, game devices for business use and home use have been widely spread. With such a game device, for example, one can enjoy a race game by a vehicle such as a car, etc.

In such a race game, for example, the player typically operates a controller or the like, and drives an F1 machine, a stock car, or the like, which runs in a virtual space, to the goal point, vying with other vehicles for earlier arrival.

Recently, such a race game has also been known, where the engine output, the suspension stiffness, and the tire performances, etc. are factored so that one can drive a vehicle with a near feeling that occurs when driving a real vehicle.

Further, such a technique has also been disclosed, which connects a plurality of game devices by a transmission line, for a multi-played racing game (for example, see Patent Literature 1).
Patent Literature 1: Unexamined Japanese Patent Application KOKAI Publication No. H7-185133 (pp. 3-6, FIG. 3)

DISCLOSURE OF INVENTION

Problem to be Solved by the Invention

In conventional race games, the velocity of the vehicle is notified to the player, generally by displaying a picture of a speed meter or the like on the game screen. Further, as the vehicle moves, the background scene, etc. to be displayed are also changed.

However, such displays have not been enough to make the player sufficiently feel the sense of speed corresponding to the velocity of the vehicle. Therefore, many players have requested renditions that can make them feel the sense of speed corresponding to the velocity.

The present invention was made in view of the above-described circumstance, and an object of the resent invention is to provide an image producing device, a speed expressing method, and a program which can appropriately express the speed of a moving object in a virtual space.

Means for Solving the Problem

An image producing device according to a first aspect of the present invention comprises an image information storage unit, an operation input reception unit, a moving condition managing unit, a view field image producing unit, a velocity calculation unit, a deformed image producing unit, and a display control unit, which are configured as follows.

First, the image information storage unit stores image information which defines a scenery image to be laid out in a virtual space. And the operation input reception unit receives an operation input for a virtual moving object to be moved in the virtual space. Then, the moving condition managing unit manages a moving condition of the moving object based on the received operation input.

The view field image producing unit produces a view field image seen from a viewpoint of the moving object, based on the stored image information and the managed moving condition. And the velocity calculation unit calculates a velocity of the moving object based on the managed moving condition. Further, the deformed image producing unit extracts an image of a predetermined area based on the velocity from the produced view field image, and produces a deformed image obtained by deforming the extracted image into a predetermined shape. Then, the display control unit synthesizes the produced view field image and the produced deformed image and displays the synthesized image.

That is, since the image of a portion (for example, a peripheral portion) is deformed according to the velocity and synthesized, the image of the synthesized portion seems to be drifting (changing drastically) to the eyes of the player. Therefore, the player can feel the sense of speed of the moving object he/she operates.

As a result, the speed of the moving object in the virtual space can be appropriately expressed.

The deformed image producing unit may extract the image of the area, which is found in correspondence with the velocity, from a peripheral portion of the produced view field image, and produce the deformed image obtained by deforming the extracted image into a shape which covers the peripheral portion of the view field image.

In this case, since the image of the peripheral portion is deformed according to the velocity and synthesized, the image of the peripheral portion seems to be drifting to the eyes of the player. As a result, the speed of the moving object can be appropriately expressed.

The deformed image producing unit may produce deformed images by extracting, as texture images, rectangular areas which are found in correspondence with the velocity, respectively from peripheral portions near four sides of the produced view field image, and texture-mapping the extracted texture images respectively on four objects having a trapezoidal shape, which cover the peripheral portions of the view field image.

In this case, since the rectangular images at the peripheral portions are formed into a trapezoidal shape according to the velocity and synthesized, the images at the peripheral portions seem to be drifting to the eyes of the player. As a result, the speed of the moving object can be appropriately expressed.

The display control unit may semi-transparent the produced deformed image, and synthesize it with the produced view field image.

In this case, the synthesized portion seems to be blurry to the eyes of the player. Therefore, the player can feel the sense of speed of the moving object operated by him/herself.

A speed expressing method according to a second aspect of the present invention stores image information which defines a scenery image to be laid out in a virtual space, and comprises an operation input receiving step, a moving condition managing step, a view field image producing step, a velocity calculating step, a deformed image producing step, and a display controlling step, which are configured as follows.

First, at the operation input receiving step, an operation input for a virtual moving object to be moved in a virtual space is received. And at the moving condition managing step, a moving condition of the moving object is managed based on the received operation input. Then, at the view field image producing step, a view field image seen from a viewpoint of the moving object is produced based on the stored image information and the managed moving condition.

At the velocity calculating step, a velocity of the moving object is calculated based on the managed moving condition. And at the deformed image producing step, an image of a predetermined area based on the velocity is extracted from the produced view field image, and a deformed image is produced by deforming the extracted image into a predetermined shape. Then, at the display controlling step, the produced view field image and the produced deformed image are synthesized and displayed.

That is, since the image of a portion (for example, a peripheral portion) is deformed according to the velocity and synthesized, the image of the synthesized portion seems to be drifting (changing drastically) to the eyes of the player. Therefore, the player can feel the sense of speed of the moving object he/she operates.

As a result, the speed of the moving object in the virtual space can be appropriately expressed.

A program according to a third aspect of the present invention is configured to control a computer (including an electronic apparatus) to function as the above-described image producing device.

This program can be stored on a computer-readable information recording medium such as a compact disk, a flexible disk, a hard disk, a magneto optical disk, a digital video disk, a magnetic tape, a semiconductor memory, etc.

The above-described program can be distributed and sold via a computer communication network, independently from a computer on which the program is executed. Further, the above-described information recording medium can be distributed and sold independently from the computer.

Effect of the Invention

According to the present invention, it is possible to appropriately express the speed of a moving object in a virtual space.

BRIEF DESCRIPTION OF DRAWINGS

FIG. 4A It is an exemplary diagram showing one example of information managed by a running condition managing unit of the image producing device.

FIG. 4B It is an exemplary diagram showing one example of information managed by the running condition managing unit of the image producing device.

Figure 1:
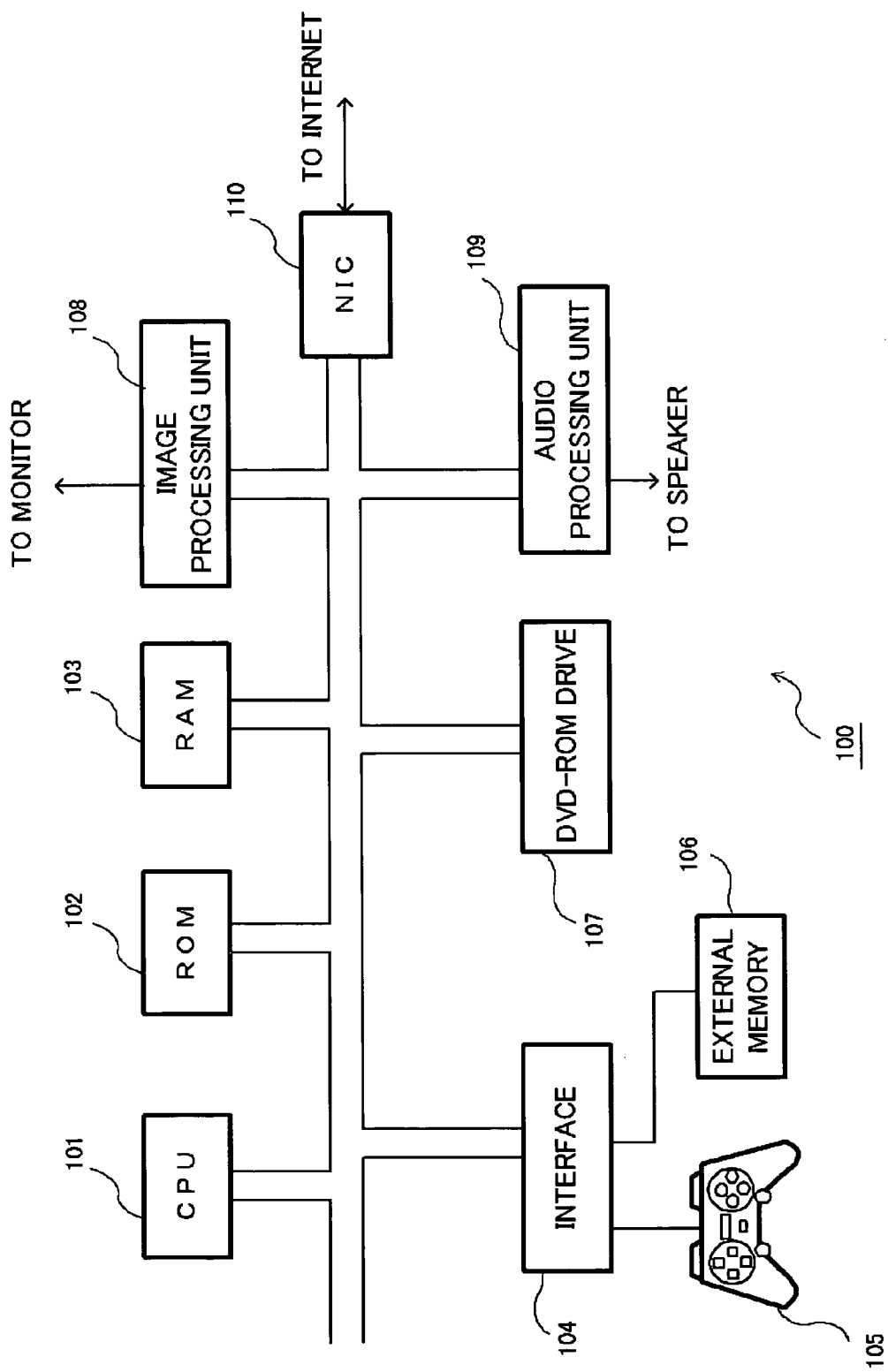
FIG. 1 It is an exemplary diagram showing a schematic structure of a typical game device on which an image producing device according to an embodiment of the present invention is realized.

EXPLANATION OF REFERENCE NUMERALS 100 game device
101 CPU
102 ROM
103 RAM
104 interface
105 controller
106 external memory
107 DVD-ROM drive
108 image processing unit
109 audio processing unit
110 NIC
200 image producing device
201 operation input reception unit
202 image information storage unit
203 running condition managing unit
204 image producing unit
205 velocity calculation unit
206 deformed image producing unit
207 display control unit

BEST MODE FOR CARRYING OUT THE INVENTION

The embodiments of the present invention will be explained below. Embodiments in which the present invention is applied to a game device will be explained below in order to facilitate understanding. However, the present invention can likewise be applied to information processing apparatuses such as computers of various types, PDAs, portable telephones, etc. That is, the embodiments to be explained below are intended for explanation, not to limit the scope of the present invention. Accordingly, though those having ordinary skill in the art could employ embodiments in which each element or all the elements of the present embodiments are replaced with equivalents of those, such embodiments will also be included in the scope of the present invention.

Embodiment 1

FIG. 1 is an exemplary diagram showing a schematic structure of a typical game device on which an image producing device according to the embodiment of the present invention will be realized. The following explanation will be given with reference to this diagram.

A game device 100 comprises a CPU (Central Processing Unit) 101, a ROM (Read Only Memory) 102, a RAM (Random Access Memory) 103, an interface 104, a controller 105, an external memory 106, a DVD (Digital Versatile Disk)-ROM drive 107, an image processing unit 108, an audio processing unit 109, and an NIC (Network Interface Card) 110.

By loading a DVD-ROM storing a game program and data onto the DVD-ROM drive 107 and turning on the power of the game device 100, the program will be executed and the image producing device according to the present embodiment will be realized.

The CPU 101 controls the operation of the entire game device 100, and is connected to each element to exchange control signals and data.

The ROM 102 stores an IPL (Initial Program Loader) to be executed immediately after the power is turned on, execution of which triggers the program stored on the DVD-ROM to be read into the RAM 103 and executed by the CPU 101. Further, the ROM 102 stores a program and various data for an operating system necessary for controlling the operation of the entire game device 100.

The RAM 103 is for temporarily storing data and programs, and retains the program and data read out from the DVD-ROM, and other data necessary for game proceedings and chat communications.

The controller 105 connected through the interface 104 receives an operation input given by the user when playing the game. The controller 105 includes direction keys, selection keys, etc.

The external memory 106 detachably connected through the interface 104 rewritably stores data indicating the progress status of the game, data of chat communication logs (records). The user can store these data on the external memory 106 where needed, by inputting instructions through the controller 105.

The DVD-ROM to be loaded on the DVD-ROM drive 107 stores a program for realizing the game and image data and audio data accompanying the game. Under the control of the CPU 101, the DVD-ROM drive 107 performs a reading process on the DVD-ROM loaded thereon to read out a necessary program and data, which are to be temporarily stored on the RAM 103, etc.

The image processing unit 108 processes the data read out from the DVD-ROM by means of the CPU 101 and an image calculation processor (unillustrated) provided in the image processing unit 108, and thereafter stores the data in a frame memory (unillustrated) provided in the image processing unit 108. The image information stored in the frame memory is converted into a video signal at a predetermined synchronization timing and output to a monitor (unillustrated) connected to the image processing unit 108. Thereby, image displays of various types are available.

Note that the image calculation processor can rapidly perform transparent operations such as overlay operation or a blending of two-dimensional images, and saturate operations of various types.

Further, the image calculation processor can also rapidly perform an operation for rendering, by a Z buffer method, polygon information placed in a virtual three-dimensional space and having various texture information added, to obtain a rendered image of the polygon placed in the virtual three-dimensional space as seen from a predetermined view position.

The audio processing unit 109 converts audio data read out from the DVD-ROM into an analog audio signal, and outputs the signal from a speaker (unillustrated) connected thereto.

Further, under the control of the CPU 101, the audio processing unit 109 generates sound effects and music data to be sounded in the course of the game, and outputs the sounds corresponding to the data from the speaker.

The NIC 110 is for connecting the game device 100 to a computer communication network (unillustrated) such as the Internet, etc., and comprises a BASE-T/100BASE-T product used for building a LAN (Local Area Network), an analog modem, an ISDN (Integrated Services Digital Network) modem, or an ADSL (Asymmetric Digital Subscriber Line) modem for connecting to the Internet by using a telephone line, a cable modem for connecting to the Internet by using a cable television line, or the like, and an interface (unillustrated) for intermediating between these and the CPU 101.

Aside from the above, the game device 100 may be configured to perform the same functions as the ROM 102, the RAM 103, the external memory 106, the DVD-ROM to be loaded on the DVD-ROM drive 107, etc. by using a large-capacity external storage device such as a hard disk, etc.

Further, it is also possible to employ an embodiment where a keyboard for accepting a character string editing input from the user, and a mouse for accepting various position designations and selection inputs from the user are connected. Furthermore, a general-purpose personal computer may be used instead of the game device 100 of the present embodiment.

(Schematic Structure of Image Producing Device)

Figure 2:
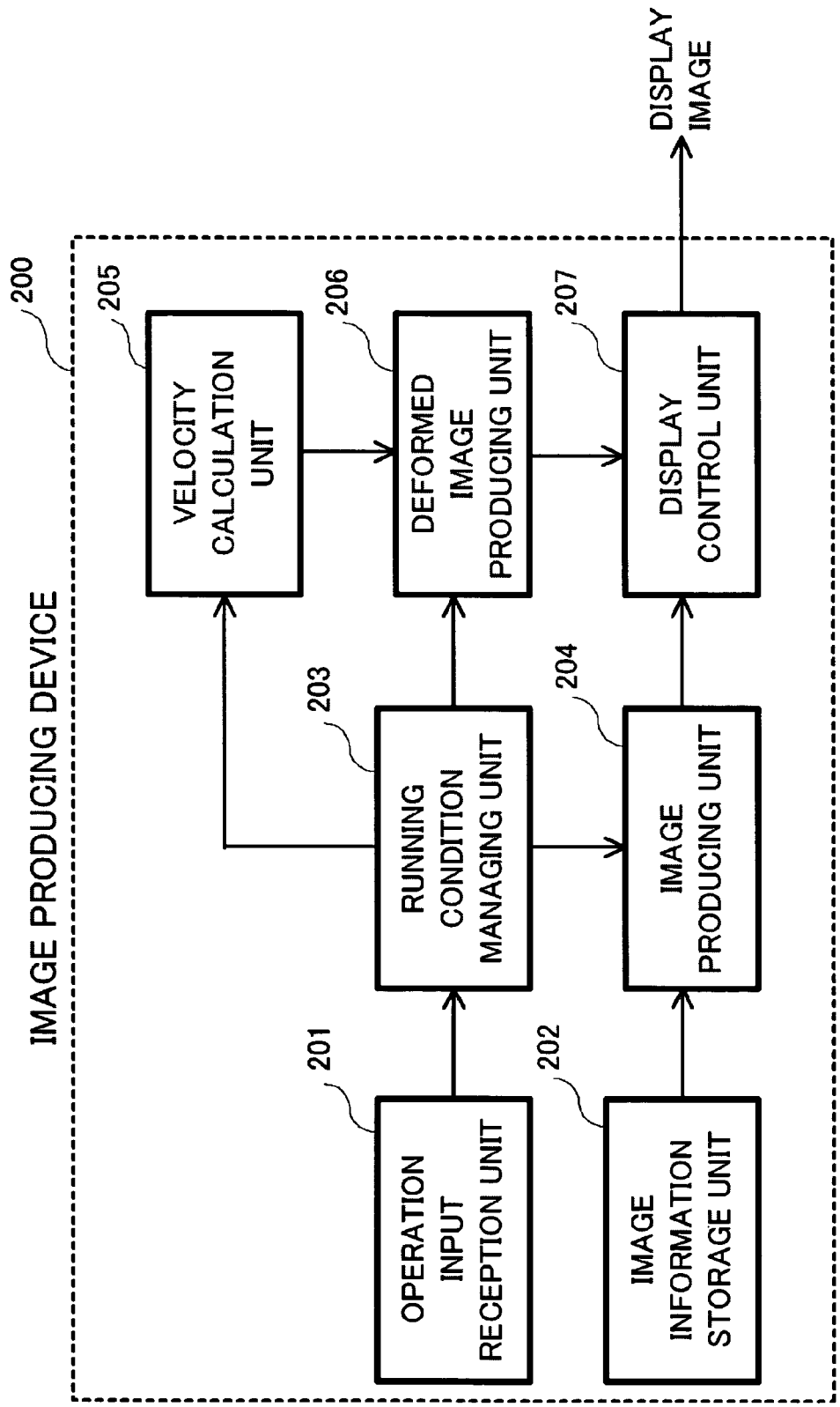
FIG. 2 It is an exemplary diagram showing one example of a schematic structure of the image producing device according to the embodiment of the present invention.

FIG. 2 is an exemplary diagram showing a schematic structure of the image producing device 200 according to the present embodiment. The following explanation will be given with reference to this diagram.

The image producing device 200 comprises an operation input reception unit 201, an image information storage unit 202, a running condition managing unit 203, an image producing unit 204, a velocity calculation unit 205, a deformed image producing unit 206, and a display control unit 207.

The explanation will be given to a case that the image producing device 200 is applied to a racing game where a racing car, which runs on a circuit within a virtual space, is operated.

First, the operation input reception unit 201 receives an operation input for a racing car (virtual vehicle) which is to be run on a circuit within a virtual space.

For example, the operation input reception unit 201 receives an operation input for a brake operation, an accelerator operation, a steering wheel operation, and a shifter operation, etc. necessary for running the racing car.

The controller 105 can function as the operation input reception unit 201.

The image information storage unit 202 stores image information which defines scenery images, etc. which include the running path on the circuit within the virtual space. Other than this, the image information storage unit 202 stores image information which defines a plurality of racing cars including the racing car to be operated by the player, and etc.

Figure 3A:
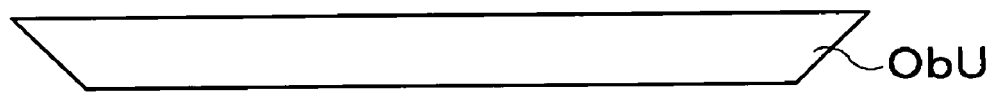
FIG. 3A It is an exemplary diagram showing one example of the shape of an object.
Figure 3B:
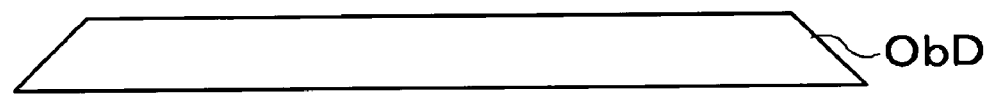
FIG. 3B It is an exemplary diagram showing one example of the shape of an object.
Figure 3C:
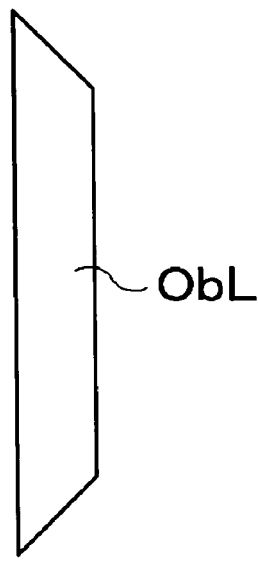
FIG. 3C It is an exemplary diagram showing one example of the shape of an object.
Figure 3D:
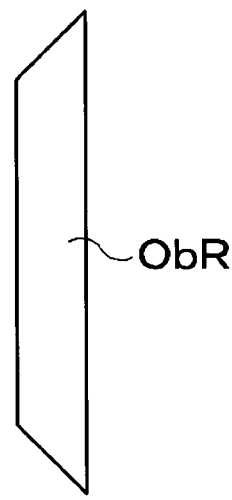
FIG. 3D It is an exemplary diagram showing one example of the shape of an object.
Figure 3E:
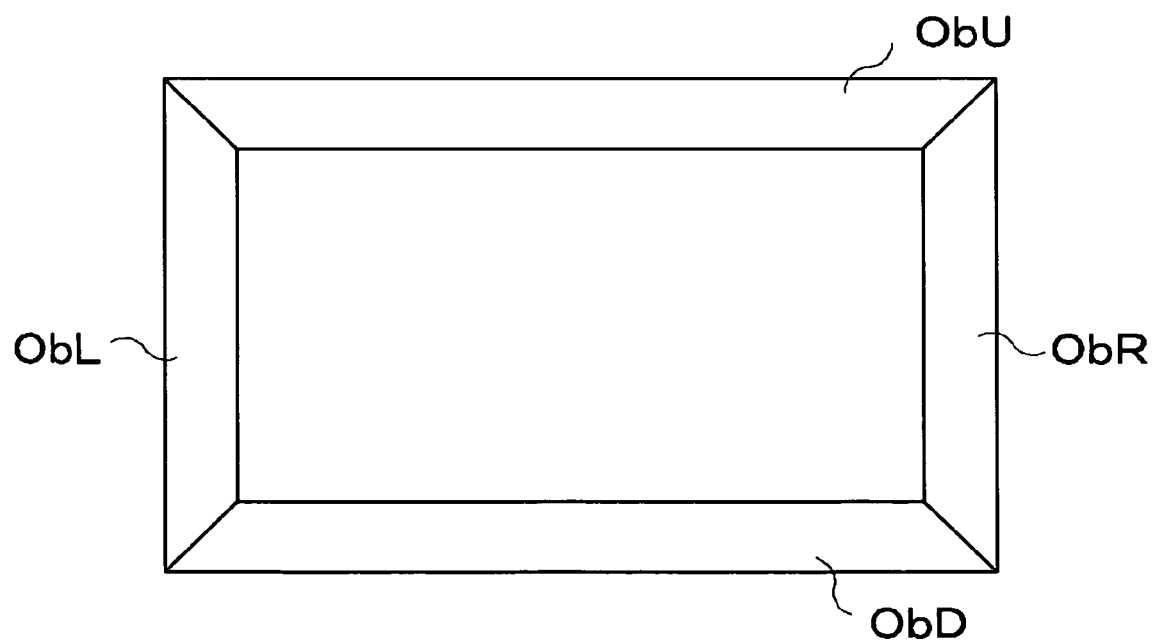
FIG. 3E It is an exemplary diagram showing correspondence between the shape of each object and a display image.

Further, the image information storage unit 202 stores trapezoidal objects (polygons, etc.) as shown in FIGS. 3A to 3D. These objects correspond to the fringes of the four sides of a display image (a view field image to be described later) as shown in FIG. 3E.

That is, the object ObU corresponds to the up side, the object ObD corresponds to the down side, the object ObL corresponds to the left side, and the object ObR corresponds to the right side.

As will be described later, the deformed image producing unit 206 texture-maps the images of peripheral portions to these objects ObU to ObR.

The DVD-ROM loaded on the DVD-ROM drive 107, the external memory 106, etc. can function as such an image information storage unit 202.

The running condition managing unit 203 manages the running conditions of the racing car operated by the player, and the running conditions of the other racing cars which are run automatically.

For example, the running condition managing unit 203 manages information which defines the running conditions as shown in FIGS. 4A and 4B.

The information shown in FIG. 4A is information to be updated where necessary, according to operation information of various types sent from the operation input reception unit 201. That is, the running conditions of the racing car operated by the player are managed by the information of FIG. 4A.

The information shown in FIG. 4B is information to be updated automatically based on predetermined logics and parameters. That is, the running conditions of the other racing cars which are run automatically are managed by the information of FIG. 4B.

Further, the running condition managing unit 203 manages contacts and collisions between racing cars, based on the information of FIGS. 4A and 4B.

The CPU 101 can function as such a running condition managing unit 203.

The image producing unit 204 produces the image (image in the proceeding direction) ahead of the racing car operated by the player, based on the image information stored in the image information storage unit 202 and the running conditions managed by the running condition managing unit 203.

Figure 5:
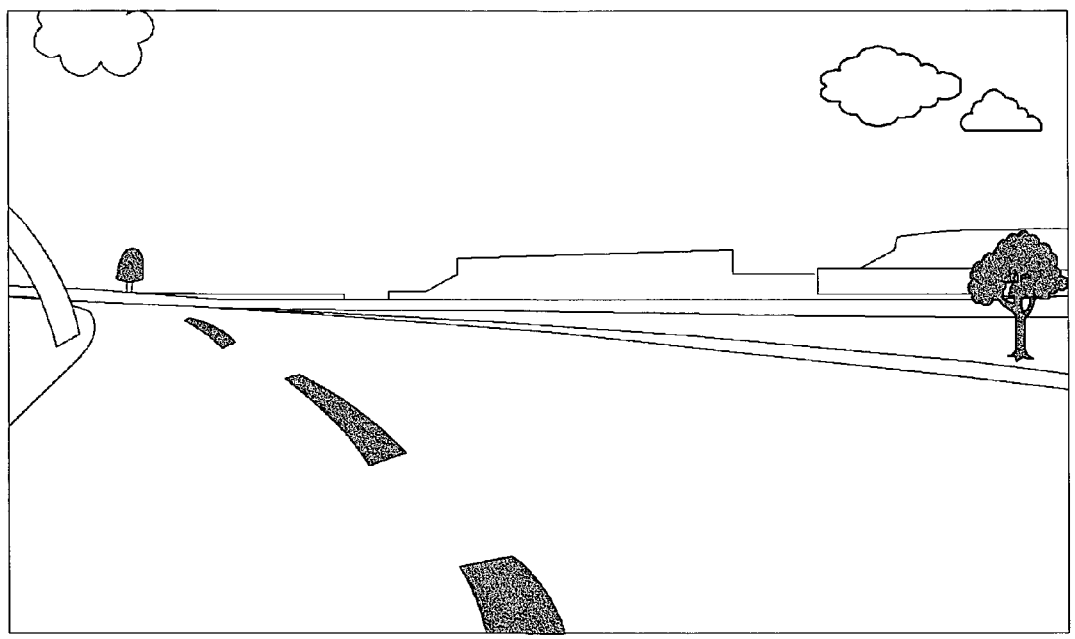
FIG. 5 It is an exemplary diagram showing one example of a view field image depicted by an image producing unit of the image producing device.

Specifically, the image producing unit 204 depicts a view field image (driver's view) as shown in FIG. 5, which is observed when the view outside the car is seen from the driver's seat of the racing car.

The image processing unit 108 can function as such an image producing unit 204.

The velocity calculation unit 205 calculates the velocity (current velocity) of the racing car operated by the player, based on the running conditions managed by the running condition managing unit 203.

The CPU 101 can function as such a velocity calculation unit 205.

The deformed image producing unit 206 extracts predetermined areas based on the velocity calculated by the velocity calculation unit 205 from the view field image produced by the image producing unit 204, and produces deformed images obtained by deforming the extracted images into a predetermined shape.

That is, the deformed image producing unit 206 extracts, as texture images, rectangular areas which are found in correspondence with the velocity, respectively from the peripheral portions near the four sides of the produced view field image, and texture-maps the extracted texture images on the objects ObU to ObR respectively, thereby producing deformed images.

Figure 6A:
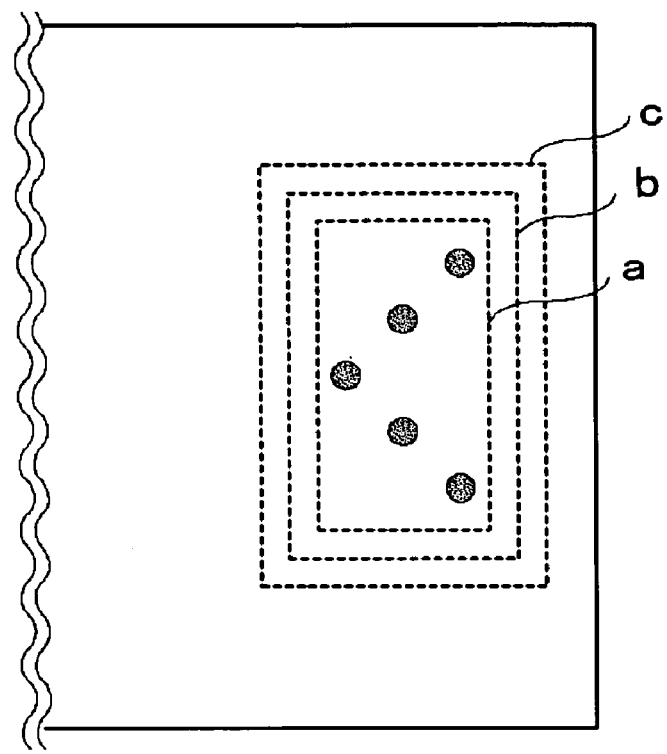
FIG. 6A It is an exemplary diagram for explaining how a deformed image is produced.

Specifically, the deformed image producing unit 206 extracts, as texture images, rectangular areas a, b, c, . . . , which are found in correspondence with the velocity, from the peripheral portion near the right side of the view field image as shown in FIG. 6A. Note that the rectangular area becomes larger as the velocity is lower, while becoming smaller as the velocity is higher. For example, these rectangular areas may be changed in a manner that the number of dots included in the vertical and horizontal sides thereof correspond to the inverse number (1/v) of the velocity v (note that the upper limit and addition/subtraction of the number of dots are defined).

Figure 6B:
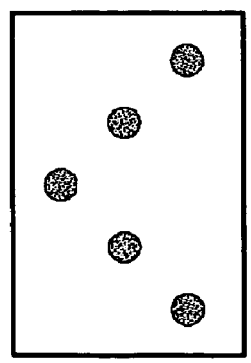
FIG. 6B It is an exemplary diagram for explaining how a deformed image is produced.
Figure 6C:
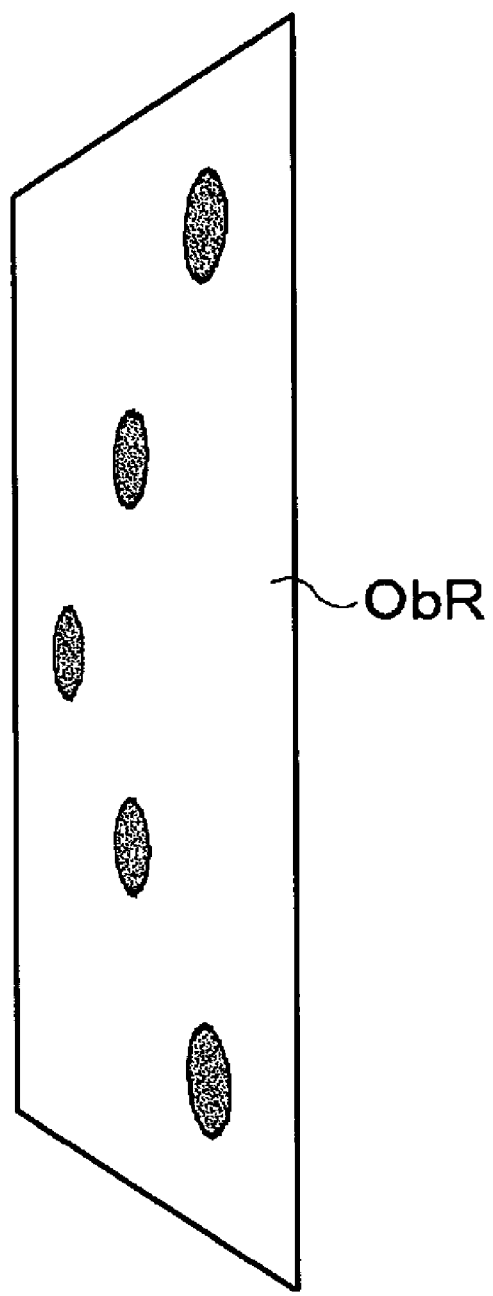
FIG. 6C It is an exemplary diagram for explaining how a deformed image is produced.

Then, when the deformed image producing unit 206 extracts such an image as shown in FIG. 6B as a texture image, it texture-maps it on the object ObR to produce a deformed image as shown in FIG. 6C.

Likewise, the deformed image producing unit 206 extracts rectangular areas found in correspondence with the velocity as texture images, respectively from the remaining three sides of the view field image, texture-maps these to the objects ObU, ObD, and ObL respectively, and produces deformed images.

The image processing unit 108 can function as such a deformed image producing unit 206.

The display control unit 207 appropriately synthesizes the view field image produced by the image producing unit 204 with the deformed images produced by the deformed image producing unit 206, and thereafter converts the synthesized image into a predetermined image signal to display the image on an external monitor or the like.

Figure 7A:
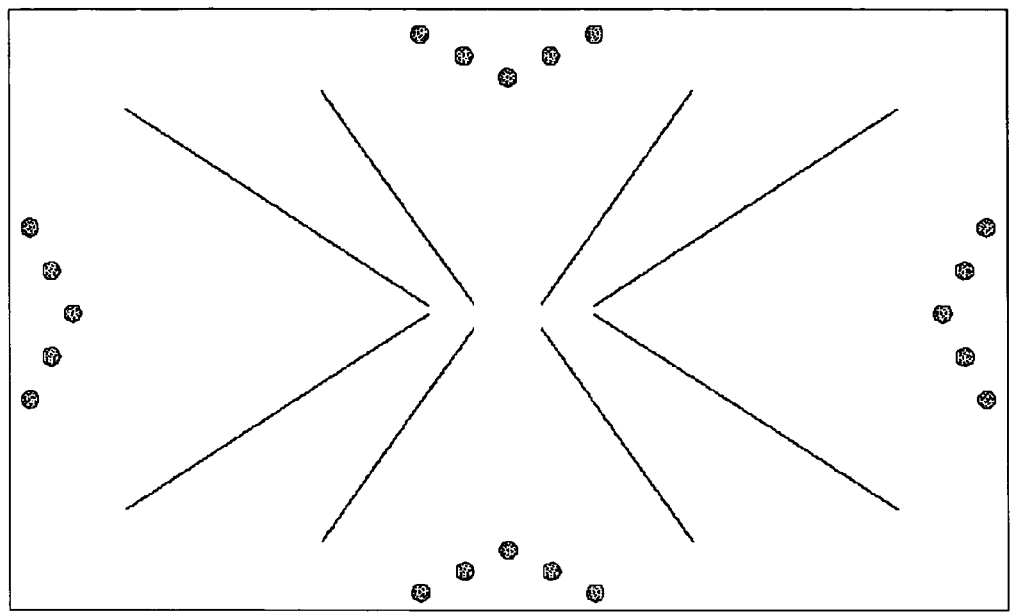
FIG. 7A It is an exemplary diagram showing one example of a view field image to be produced.
Figure 7B:
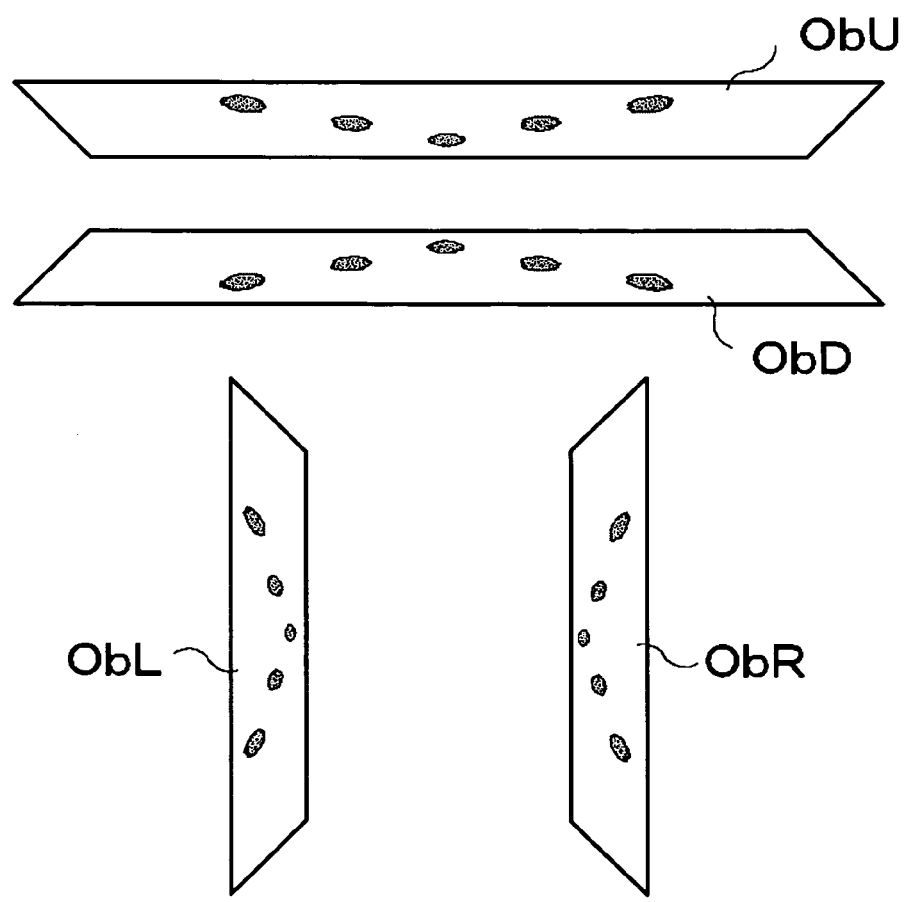
FIG. 7B It is an exemplary diagram showing one example of deformed images to be produced.
Figure 7C:
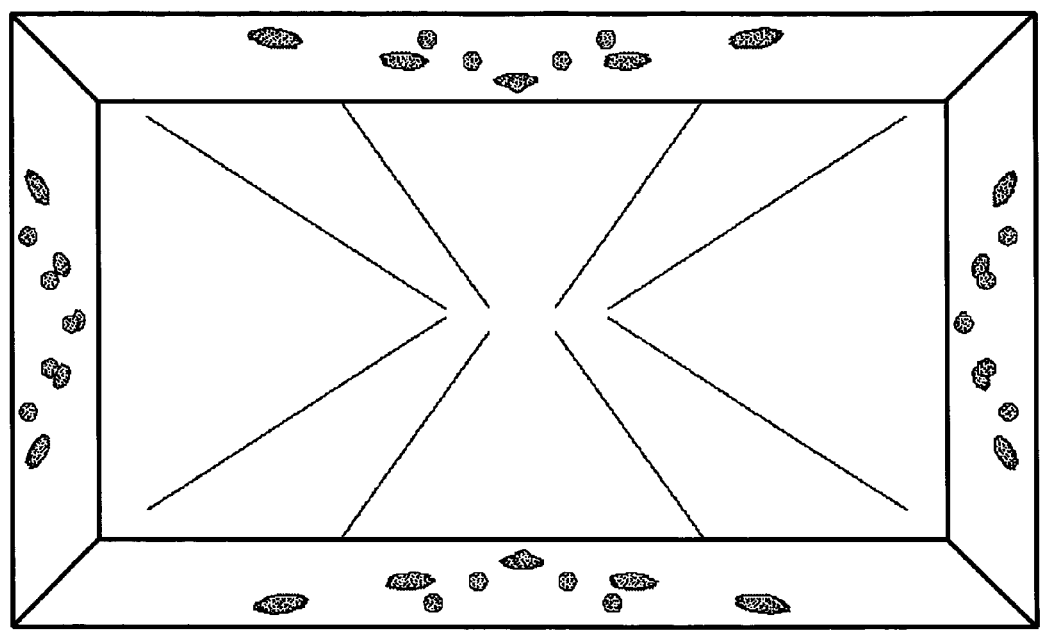
FIG. 7C It is an exemplary diagram showing one example of a display image obtained by synthesizing the deformed images on the view field image.

For example, in a case where the image producing unit 204 produces a view field image as shown in FIG. 7A and the deformed image producing unit 206 produces deformed images (texture-mapped objects ObU to ObR) as shown in FIG. 7B, the display control unit 207 semi-transparents the deformed images and synthesizes them on the view field image. That is, the display control unit 207 synthesizes the deformed images on the view field image by α blending, thereby producing a display image as shown in FIG. 7C.

Since the rectangular images in the peripheral portions are deformed into a trapezoidal shape in correspondence with the velocity and synthesized in this manner, the images in the peripheral portions seem to be drifting (changing drastically) and blurry to the eyes of the player. Therefore, the player can feel the speed of the moving object operated by him/herself.

The image processing unit 108 can function as such a display control unit 207.

Figure 8:
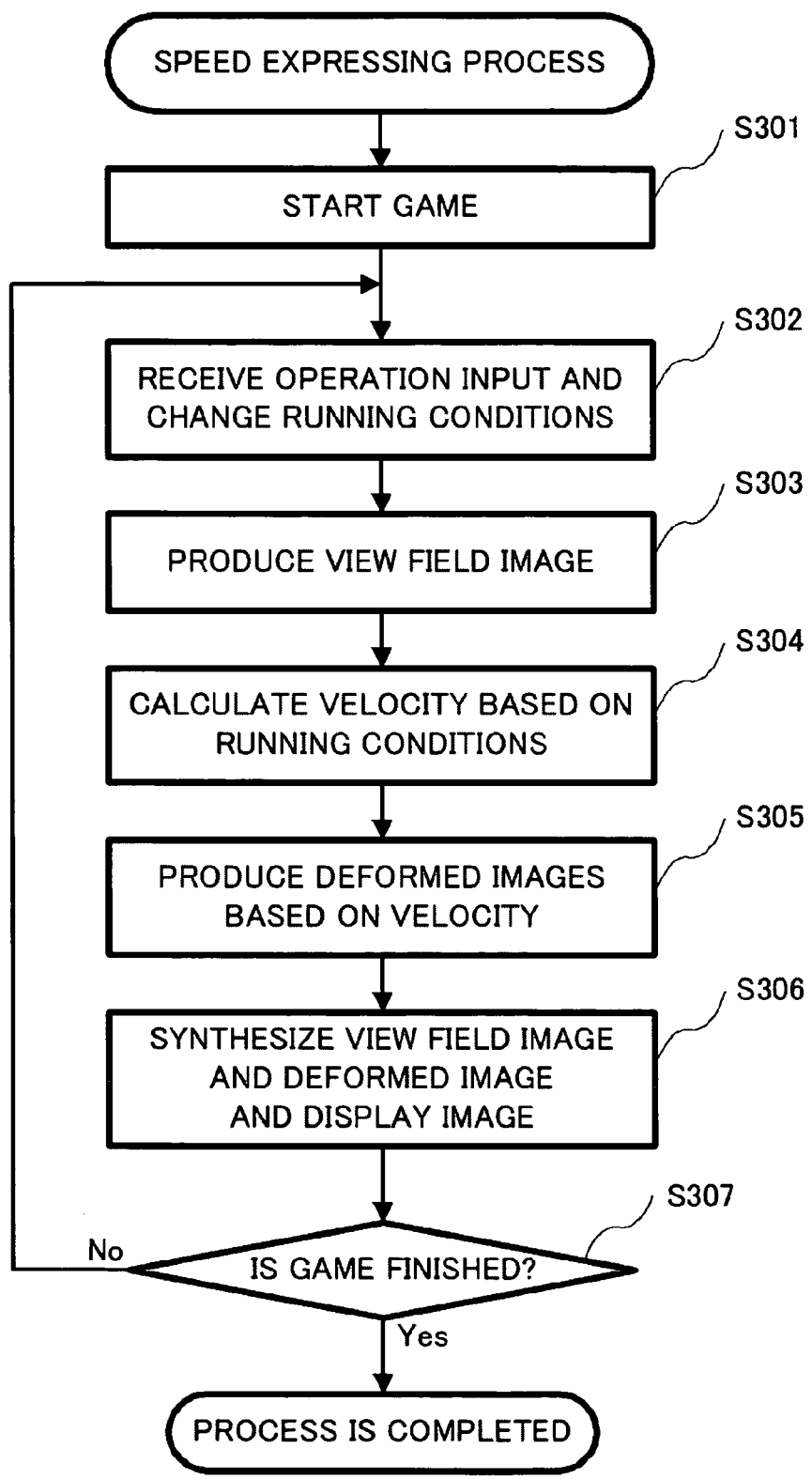
FIG. 8 It is a flowchart showing the flow of control of a speed expressing process performed by the image producing device.

FIG. 8 is a flowchart showing the flow of a speed expressing process performed by the image producing device 200. The following explanation will be given with reference to this drawing. Note that this speed expressing process will be started, for example, together with progress of the game in playing the car race game.

That is, when the car race game is started (step S301), the image producing device 200 receives an operation input, and updates the running conditions of the racing car (step S302).

That is, when the operation input reception unit 201 receives an accelerator operation, a brake operation, a steering wheel operation, and a shifter operation, etc. of the player, the running condition managing unit 203 updates the running conditions (current position, running direction, etc.) according to the operations.

The image producing device 200 produces a view field image according to the running conditions (step S303).

That is, the image producing unit 204 produces a view field image (driver's view) based on the image information stored in the image information storage unit 202 and the running conditions managed by the running condition managing unit 203.

The image producing device 200 calculates the velocity based on the running conditions (step S304).

That is, the velocity calculation unit 205 calculates the velocity of the racing car operated by the player, based on the running conditions managed by the running condition managing unit 203.

The image producing device 200 produces deformed images based on the calculated velocity (step S305).

That is, the deformed image producing unit 206 extracts, as texture images, rectangular areas which are found in correspondence with the velocity calculated by the velocity calculation unit 205, respectively from the peripheral portions near the four sides of the view field image produced by the image producing unit 204. Then, the deformed image producing unit 206 produces deformed images by texture-mapping the extracted texture images on the objects ObU to ObR as shown in FIGS. 3A to 3D respectively.

The image producing device 200 displays a display image obtained by synthesizing the view field image and the deformed images (step S306).

That is, the display control unit 207 appropriately synthesizes the view field image produced by the image producing unit 204 with the deformed images produced by the deformed image producing unit 206, thereafter converts the image into a predetermined image signal, and displays it on the external monitor or the like.

Figure 9A:
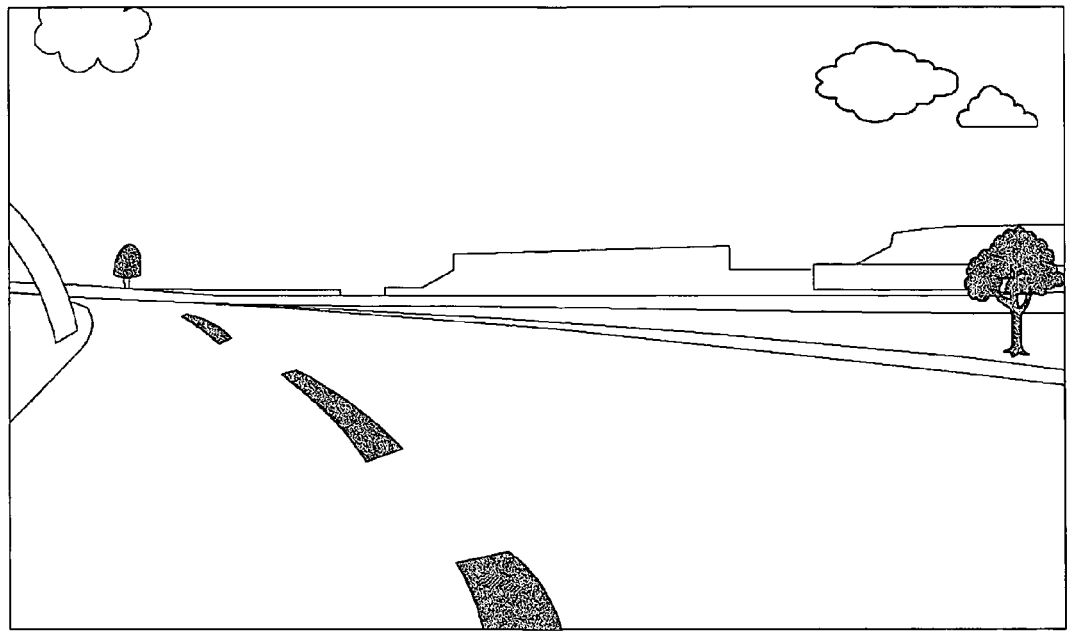
FIG. 9A It is an exemplary diagram showing one example of a display image.

For example, when the velocity of the racing car operated by the player is low, such a display image as shown in FIG. 9A is synthesized and displayed. There are few changes observed in the peripheral portions of the display image of FIG. 9A.

This is because, since large rectangular areas are extracted by the deformed image producing unit 206 as texture images respectively from the peripheral portions of the view field image and texture-mapped on the objects ObU to ObR respectively, the produced deformed images do not show great changes.

Figure 9B:
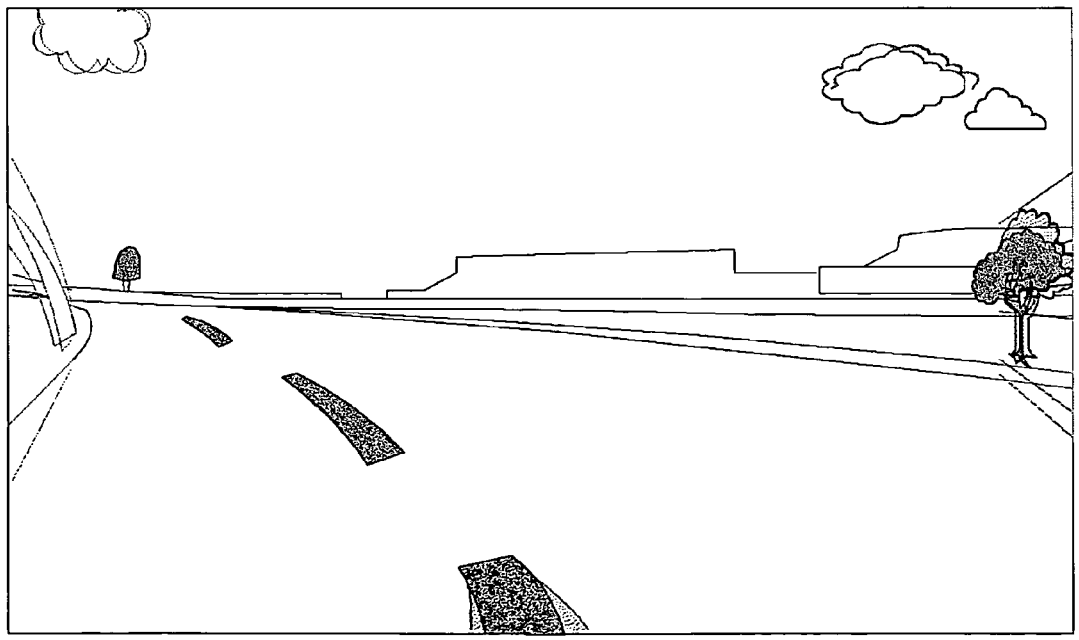
FIG. 9B It is an exemplary diagram showing one example of a display image.

On the other hand, in a case where the velocity of the racing car is high, such a display image as shown in FIG. 9B is synthesized and displayed. The peripheral portions are expressed as drifting (changing drastically) and blurry in the display image of FIG. 9B.

This is because, since smaller rectangular areas are extracted by the deformed image producing unit 206 as texture images respectively from the peripheral portions of the view field image and texture-mapped on the objects ObU to ObR respectively, the produced deformed images show great changes.

Then, the image producing device 200 determines whether or not the game is finished (step S307).

In a case where it is determined that the game is not finished, the image producing device 200 returns the process to step S302, and repeatedly performs the processes of the above-described steps S302 to S307.

On the other hand, in a case where it is determined that the game is finished, the image producing device 200 completes the speed expressing process.

As described above, according to the present embodiment, it is possible to appropriately express the velocity of the moving object in the virtual space.

Other Embodiments

In the above-described embodiment, a case has been explained where the deformed images are produced from all of the four sides of the view field image and synthesized.

However, deformed images may be produced from a less than four number of sides of the view field image and synthesized.

Figure 10:
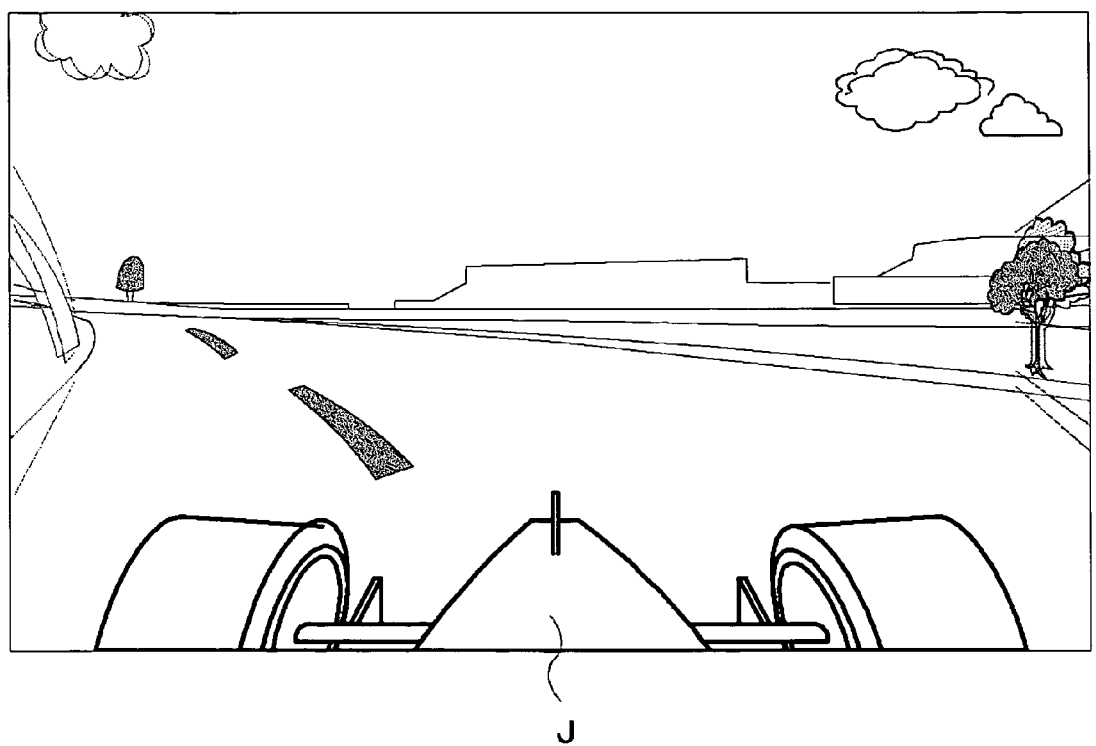
FIG. 10 It is an exemplary diagram showing one example of a display image in which a vehicle is displayed.

For example, in a case where a vehicle image J of the racing car is displayed as shown in FIG. 10, rectangular areas which are found in correspondence with the velocity may be extracted as texture images from the peripheral portions of the three sides among the four sides, that exclude the down side, and these may be texture-mapped on the three objects (objects ObU, ObL, and ObR) and synthesized.

Further, in the above-described embodiment, a case has been explained where texture images having a rectangular shape are texture-mapped on the objects having a trapezoidal shape as shown in FIGS. 3A to 3D. However, the shape of the objects is not limited to a trapezoidal shape, but arbitrary.

For example, texture images may be texture-mapped on objects having a triangular shape.

Further, in the above-described embodiment, a case has been explained, as an example, where movements are made in the depth direction in the virtual space as seen from the viewpoint of the player. However, the direction of movements is not limited to the depth direction but arbitrary. For example, the present invention can be applied to the so-called vertical scrolling and horizontal scrolling, where needed.

In doing so, texture images may be extracted from the left and right two sides in case of vertical scrolling or from the up and down two sides in case of horizontal scrolling, and texture-mapped on objects having a parallelogram shape.

Further, in the above-described embodiment, the explanation has been given by employing a virtual vehicle (racing car) which runs in a virtual space as an example. However, the present invention can be applied to any object (virtual moving object) that moves in a virtual space.

For example, a virtual flying object (jet plane, passenger plane, etc.) which flies in a virtual space may be the object of operation.

The present application claims priority based on Japanese Patent Application No 2004-163824, the content of which is incorporated herein in its entirety.

INDUSTRIAL APPLICABILITY

As explained above, according to the present invention, it is possible to provide an image producing device, a speed expressing method, and a program suitable for appropriately expressing the speed of a moving object in a virtual space.

The invention claimed is:
1. An image producing device, comprising:
an image information storage unit which stores image information which defines a scenery image to be laid out in a virtual space;
an operation input reception unit which receives an operation input for a virtual moving object to be moved in the virtual space;
a moving condition managing unit which manages a moving condition of the moving object based on the received operation input;
a view field image producing unit which produces a view field image seen from a viewpoint of the moving object, based on the stored image information and the managed moving condition;
a velocity calculation unit which calculates a velocity of the moving object based on the managed moving condition;
a deformed image producing unit which extracts an image of a predetermined rectangular area based on the velocity from a peripheral portion of the produced view field image, and produces a deformed image obtained by deforming the extracted image into a trapezoidal shape; and
a display control unit which synthesizes the produced view field image and the produced deformed image and displays the synthesized image.
2. An image producing device comprising:
an image information storage unit which stores image information which defines a scenery image to be laid out in a virtual space;

an operation input reception unit which receives an operation input for a virtual moving object to be moved in the virtual space;

a moving condition managing unit which manages a moving condition of the moving object based on the received operation input;

a view field image producing unit which produces a view field image seen from a viewpoint of the moving object, based on the stored image information and the managed moving condition;

a velocity calculation unit which calculates a velocity of the moving object based on the managed moving condition;

a deformed image producing unit which extracts an image of a predetermined area based on the velocity from the produced view field image, and produces a deformed image obtained by deforming the extracted image into a predetermined shape; and a display control unit which synthesizes the produced view field image and the produced deformed image and displays the synthesized image;

wherein said deformed image producing unit produces deformed images by extracting, as texture images, rectangular areas which are found in correspondence with the velocity, respectively from peripheral portions near four sides of the produced view field image, and texture-mapping the extracted texture images respectively on four objects having a trapezoidal shape, which cover the peripheral portions of the view field image.

3. The image producing device according to claim 1, wherein said display control unit semi-transparents the produced deformed image, and synthesizes it with the produced view field image.

4. A non-transitory computer-readable information recording medium which stores a program for controlling a computer to function as an image information storage unit, an operation input reception unit, a moving condition managing unit, a view field image producing unit, a velocity calculation unit, a deformed image producing unit, and a display control unit, wherein: said image information storage unit stores image information which defines a scenery image to be laid out in a virtual space;

said operation input reception unit receives an operation input for a virtual moving object to be moved in the virtual space;

said moving condition managing unit manages a moving condition of the moving object based on the received operation input;

said view field image producing unit produces a view field image seen from a viewpoint of the moving object, based on the stored image information and the managed moving condition;

said velocity calculation unit calculates a velocity of the moving object based on the managed moving condition;

said deformed image producing unit extracts an image of a predetermined rectangular area based on the velocity from the produced view field image, and produces a deformed image obtained by deforming the extracted image into a trapezoidal shape; and said display control unit synthesizes the produced view field image and the produced deformed image and displays the synthesized image.

* * * * *

UNITED STATES PATENT AND TRADEMARK OFFICE
CERTIFICATE OF CORRECTION

PATENT NO. : 7,985,136 B2  
APPLICATION NO. : 11/587499  
DATED : July 26, 2011  
INVENTOR(S) : Takeshi Okubo Page 1 of 1

It is certified that error appears in the above-identified patent and that said Letters Patent is hereby corrected as shown below:

ON THE TITLE PAGE, Item (73):

Patent states "Assignee: Konomi Digital Entertainment Co., Ltd.", should be -- Konami Digital Entertainment Co., Ltd. --.

Signed and Sealed this  
Twenty-ninth Day of May, 2012

David J. Kappos  
*Director of the United States Patent and Trademark Office*